(12) United States Patent
Hoffmann

(10) Patent No.: US 7,984,654 B2
(45) Date of Patent: Jul. 26, 2011

(54) TESTING DEVICE FOR TUBE BUNDLE REACTORS

(75) Inventor: Michael Hoffmann, Beijing (CN)

(73) Assignee: Süd-Chemie AG, München (DE)

( * ) Notice: Subject to any disclaimer, the term of this patent is extended or adjusted under 35 U.S.C. 154(b) by 196 days.

(21) Appl. No.: 12/302,641

(22) PCT Filed: Mar. 27, 2007

(86) PCT No.: PCT/EP2007/002703
§ 371 (c)(1),
(2), (4) Date: Apr. 28, 2009

(87) PCT Pub. No.: WO2007/137645
PCT Pub. Date: Dec. 6, 2007

(65) Prior Publication Data
US 2009/0217770 A1    Sep. 3, 2009

(30) Foreign Application Priority Data

May 31, 2006  (DE) .................. 10 2006 025 441

(51) Int. Cl.
*G01B 5/30* (2006.01)
(52) U.S. Cl. .................. 73/760; 73/781
(58) Field of Classification Search ........... 73/760–860
See application file for complete search history.

(56) References Cited

U.S. PATENT DOCUMENTS

| 2,078,868 | A | 2/1937 | Smith |
| 3,913,806 | A | 10/1975 | Red, Jr. |
| 4,402,643 | A | 9/1983 | Lytton |
| 4,461,327 | A | 7/1984 | Magin |
| 5,890,868 | A | 4/1999 | Comardo |
| 5,897,282 | A | 4/1999 | Comardo |
| 6,032,828 | A | 3/2000 | Gicza |
| 6,411,667 | B2 * | 6/2002 | Kim et al. ............... 376/305 |
| 6,526,114 | B2 * | 2/2003 | Paillaman et al. ........ 376/249 |
| 6,694,802 | B1 | 2/2004 | Comardo |
| 6,907,791 | B2 * | 6/2005 | Choe et al. ............... 73/794 |
| 6,981,404 | B2 * | 1/2006 | Johns et al. .............. 73/49.5 |
| 6,981,422 | B1 | 1/2006 | Comardo |
| 7,320,355 | B2 | 1/2008 | Skerdi et al. |
| 7,897,120 | B2 * | 3/2011 | Hoffmann et al. ......... 422/219 |
| 2002/0056312 | A1 * | 5/2002 | Tamura et al. ........... 73/61.71 |

FOREIGN PATENT DOCUMENTS

| DE | 2613310 | 10/1977 |
| DE | 3935636 A1 | 5/1991 |
| DE | 19934324 | 9/2000 |
| EP | 0311712 A1 | 4/1989 |
| WO | WO9308907 A1 | 5/1993 |
| WO | WO2005118125 A1 | 12/2005 |

* cited by examiner

*Primary Examiner* — Max Noori
(74) *Attorney, Agent, or Firm* — Scott R. Cox

(57) ABSTRACT

The invention relates to a testing device for tube bundle reactors, with a multitude of tubes (22) arranged as a bundle. At least one probe (12) is movably mounted in or on the testing device (10) and has, in particular, a drive (32) for its movement.

17 Claims, 2 Drawing Sheets

TESTING DEVICE FOR TUBE BUNDLE REACTORS

Figure 1:
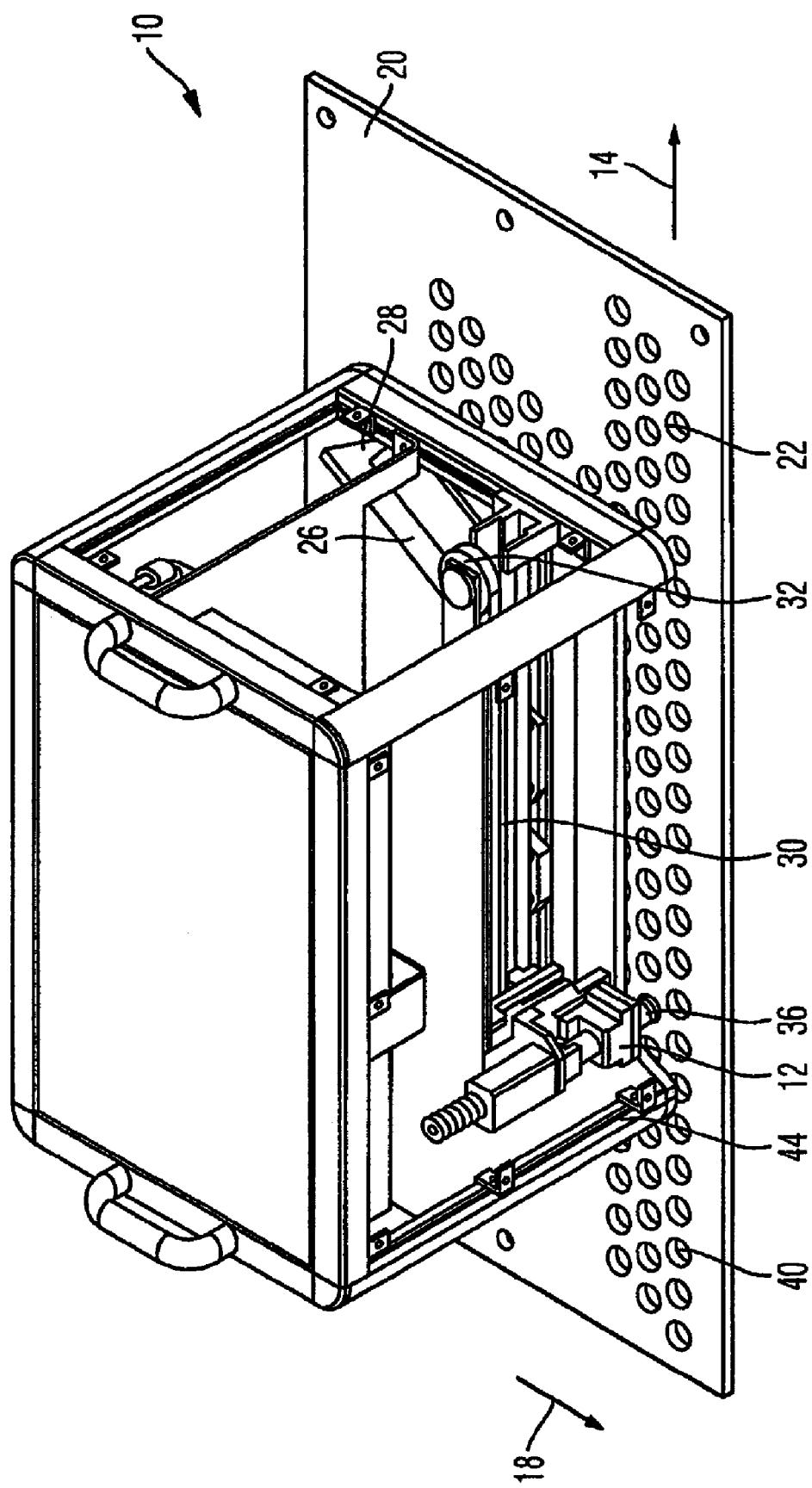

The invention relates to a testing device according to the preamble of claim 1 and to a method for the operation of a tube bundle reactor according to the preamble of claim 14.

Tube bundle reactors consist of a large number of vertical tubes arranged parallel to one another which are filled with specific, usually granular solids and then flowed through in order to carry out the reaction. The granular solids can also be introduced in several layers. When flowed through, the tubes are practically fluidically connected in parallel, with the result that the flow resistance of every single tube is decisive for the flow rate present there.

If a tube displays only a much smaller flow resistance, the flow velocity there increases considerably because of the parallel connection, with the result that the reaction does not take place in the desired manner in the tube concerned and/or the granular solid is consumed too quickly. It is therefore understandable that the reaction quality of the reactor is thereby greatly reduced.

Tube bundle reactors have long been known, in which respect reference is made by way of example to U.S. Pat. No. 2,070,868. There, as uniform as possible a flow rate of the parallel tubes is already discussed.

In order to achieve an acceptable reaction result, the filling must take place as uniformly as possible, with the result that additional manual work is often necessary even if provision is made per se for an automatic filling, as mentioned for example in U.S. Pat. No. 3,913,806.

Reactors have recently become much larger, with the result that reactors with 20,000 or even 40,000 tubes are no longer rare. Testing the flow resistance and thus the filling quality in such reactors is extremely laborious. Yet such solutions are regularly put into practice, in which respect reference is to be made for example to DE-OS 39 35 636.

It has also been proposed to introduce a plurality of testing probes, which are attached to a common yoke, into the tube apertures arranged in a grid, in order to thus carry out the measurements more quickly. However, this solution has not proved successful, as the simultaneous introduction of for example eight or twelve tubes is not easy to carry out in practice, as typically there are pitch differences of several millimetres in the reactors realized in practice, which leads to the measuring probes not tightly sealing off, with the result that incorrect measurements occur.

It has also been proposed in this connection to house the adapters of the measuring probes swivellably mobile in order to avoid problems in this respect. But this is not a solution either, as the problem with a swivellably mobile housing is that an adapter swivels somewhat during the introduction process, with the result that it does not actually meet the tube aperture intended for it.

The object of the invention is therefore to provide a testing device for tube bundle reactors according to the preamble of claim 1 which reliably and efficiently detects differences in the throughflow resistance of the tubes without the danger of incorrect measurements arising.

This object is achieved according to the invention by claim 1. Advantageous developments result from the dependent claims.

The solution according to the invention allows a large number of tubes of a tube bundle reactor to be tested off the reel. According to the invention it is provided that a probe is housed mobile, preferably driven, inside the testing device or at the testing device.

The probe can thus reach a large number of tube apertures in succession and test every tube in a targeted manner. The individual approach surprisingly results in a much improved adjustment possibility even if there are pitch differences of the tube apertures. The probe can then also, with its tube connection socket, approach and test any chosen tube inside its path in a targeted manner without the danger of a neighbouring tube mistakenly being tested instead or the tube connection socket not being fitted on correctly. Incorrect measurements can thus surprisingly be ruled out with certainty.

According to the invention it is preferably provided that the testing device can be automatically moved over the surface of the reactor. The method is then implemented in the grid of the tubes and the movement of the probe in or at the testing device takes place across the direction of travel. In this way a strip of tubes can be automatically tested. The testing device stops automatically when the end of the reactor is reached.

The testing device can be driven in any suitable way. For example, the testing device can be supported via individually swivellably mobile drive clutches in the tube aperture which can then move forward by one tube's distance through a shifting movement of the testing device. The testing device can then stop and the probe can test the row of tubes successively, being moved over this row of tubes via its drive mechanism.

Because the measurement of the tubes is sequential, the probe can be automatically set in targeted manner for every tube, which is a precondition for an automatic operation, with the result that a problem-free test is guaranteed.

It is also particularly advantageous that only a single tube connection socket has to be changed for other tube diameters. The diameter of the tube connection socket is thereby preferably smaller than the diameter of the tube, for example in the ratio of 1:2, and sealing takes place via an inflatable membrane which lies ring-shaped in the manner of a bead on the outside between the tube wall and the tube connection socket and seals off there. Unround tubes can thereby also be well sealed thereby, and the sealing takes place even if the tube aperture itself is somewhat damaged or weld seams or cavities project into the tube there.

The tubes of a tube bundle reactor can bend as a result of high operating temperatures, with the result that a degree of skew is possible. This skew can also be compensated according to the invention by the tube connection socket; a sealing can still be guaranteed by the inflatable membrane.

According to the invention it is preferred if the testing device notes the tubes in which the flow resistance is too large or too small, wherein the alarm threshold is preferably adjustable in this respect.

In another version it is provided that the testing device marks the tubes with too great or too small a throughflow resistance. It can thereby also be guaranteed that the tube bundle reactor displays a uniform throughflow resistance of all the tubes after the test and the necessary correction Further advantages, details and features are to be found in the following description of an embodiment with the help of the drawing.

There are shown in:

FIG. 1 a schematic view of a testing device according to the invention; and

Figure 2:
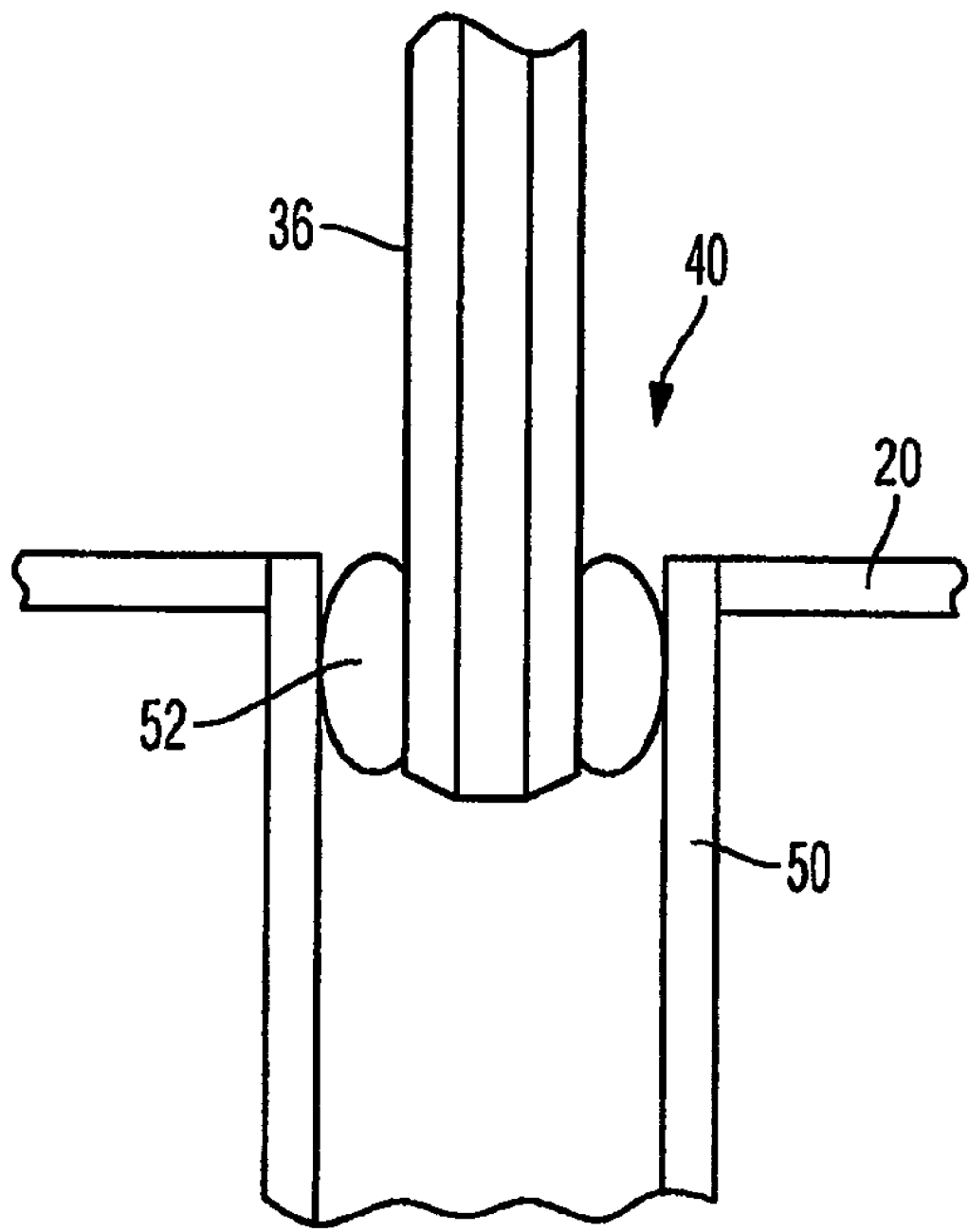

FIG. 2 a detailed view of the tube connection socket of the probe in the testing device according to the invention.

The testing device 10 shown in FIG. 1 has a probe 12 which is housed mobile in crosswise direction 14 in the testing device 10.

The testing device is intended to be moved along its direction of travel 18 over a reactor 20 which has a large number of tubes 22 which are arranged tightly packed, i.e. with rows offset relative to one another.

For the advance along the direction of travel 18, a schematic drive device 26 is provided, which for example operates pneumatically and which advances the testing device 10 by one row via a supporting clutch 28.

The probe 12 is mounted on a rail 30 and mobile above same in crosswise direction 14. It has a schematically represented drive means 32 for the movement. A connection socket 36 is also provided which ensures the connection between the probe 12 and the appurtenant aperture 40 of a tube of the reactor 20.

The connection socket is vertically mobile but also, thanks to the inflatable membrane provided there, adapts to slight variations in the shapes of the aperture 40.

In the embodiment shown, the probe 12 can be moved over 10 tubes of a row of tubes. It is understood that this number and the arrangement can be adapted to requirements within broad limits. For example, two probes can also be fitted alongside each other, which can then be moved practically simultaneously and perform the test synchronously.

For the test, once the probe 10 has been connected to the aperture 40 concerned, it is subjected to the action of above-atmospheric or below-atmospheric compressed air and the development of the internal pressure in the probe is tested. This represents a measure of the flow resistance of the tube concerned.

As can be seen from FIG. 1, the probe 12 is attached directly adjacent to the front edge 44 of the testing device 10. A row of tubes can thereby be tested even if there is an obstacle in the next row of tubes, for example a thermoelement projecting from the tube concerned.

It can be seen from FIG. 2 how the connection socket 36 can be introduced into an aperture 50 of a tube 40. The connection socket 36 has a much smaller outer diameter than the inner diameter of the tube 50. For sealing off, an inflatable membrane 52 is provided which is inflated in a manner controlled by the testing device 10 if the connection socket 36 has dropped into the tube.

A secure sealing can thereby be guaranteed, as the inflatable membrane 52 preferably consists of an elastic material which hugs the surface of the tube 50.

The invention claimed is:

1. Testing device for tube bundle reactors, with a large number of tubes which are arranged in the manner of a bundle, comprising a drive device adapted to automatically move the testing device in a direction over the tube bundle reactor, at least one probe housed mobile in or at the testing device and a drive means for movement moving the at least one probe automatically in a direction transverse to the direction of travel of the testing device.

2. Testing device according to claim 1, characterized in that the at least one probe can be moved over several tubes.

3. Testing device according to claim 1, wherein the at least one probe is adapted to be readjusted in respect of its position by an introduction cone at a tube connection socket of the at least one probe.

4. Testing device according to claim 3, characterized in that the drive means for moving the at least one probe is also elastically housed in horizontal direction and is adapted to perform a height adjustment in the case of different heights of the tubes.

5. Testing device according to claim 4, characterized in that the at least one probe, is adapted to center automatically the testing device in two directions, namely in the direction of travel of the testing device and in the direction of movement of the probe upon introduction into a tube.

6. Testing device according to claim 1, comprising a plurality of probes which are adopted to be separately steered alongside one another or behind one another, relative to the direction of travel of the testing device.

7. Testing device according to claim 1, wherein the testing device is adapted to travel over the whole width of the tube bundle reactor and in the process automatically tests a large number of rows of tubes, in respect of the throughflow resistance.

8. Testing device according to claim 1, wherein the at least one probe is housed, in relation to the direction of travel of the testing device, in the front third of the testing device, mobile over its width.

9. Testing device according to claim 1, wherein a large number of tubes of the tube bundle reactor extends substantially flat to the surface of the reactor and several thermoelement tubes are distributed over the reactor and project from the surface, and wherein the testing device is adapted, on approaching the thermoelement tubes, to also test the tubes which—seen in the direction of travel of the testing device—are immediately adjacent to the thermoelement tubes.

10. Testing device according to claim 7, wherein the testing device is adapted to signal the tubes whose throughflow resistance differs more markedly from one of a nominal throughflow resistance than corresponds to a fixed upper threshold value and differs more markedly than corresponds all to from a fixed lower threshold value.

11. Testing device according to claim 10, wherein the testing device is adapted to mark the tubes deviating from the nominal throughflow resistance as it passes over them.

12. Testing device according to claim 11, further comprising an approach sensor which switches off its forward movement upon approaching an obstacle.

13. Testing device according to claim 1, further comprises an introduction sensor which prevents the tube connection socket from dropping into a tube if an obstacle occurs.

14. A method of operating a tube bundle reactor, comprising placing a testing device at any chosen point on the top of the tube bundle reactor, and causing the testing device to travel automatically over the width of the tube bundle reactor and to test the tubes of a row of tubes during the travel with at least one probe, which is mobile transversely to the direction of travel.

15. Method according to claim 14, further comprising stopping the testing device for testing the tubes of a strip of tubes and testing a plurality of tubes, which are arranged directly adjacent to one another, automatically in succession via the at least one probe.

16. Testing device according to claim 1, wherein the at least one probe is movable over more than five tubes.

17. The testing device according to claim 13, wherein the obstacle is one of the welded-up tube and tube connection socket, which is not compatible with the tubes of the tube bundle reactor.

* * * * *